US008199219B2

(12) United States Patent  (10) Patent No.: US 8,199,219 B2
Barnett  (45) Date of Patent: Jun. 12, 2012

(54) SINGLE-BUTTON AUDIO DATA CAPTURE AND DELETION

(75) Inventor: Ricky Barnett, Hertfordshire (GB)

(73) Assignee: Nokia Corporation, Espoo (FI)

( * ) Notice: Subject to any disclaimer, the term of this patent is extended or adjusted under 35 U.S.C. 154(b) by 691 days.

(21) Appl. No.: 11/988,184

(22) PCT Filed: Nov. 2, 2005

(86) PCT No.: PCT/EP2005/055709
§ 371 (c)(1),
(2), (4) Date: May 22, 2009

(87) PCT Pub. No.: WO2007/003234
PCT Pub. Date: Jan. 11, 2007

(65) Prior Publication Data
US 2009/0295942 A1  Dec. 3, 2009

(30) Foreign Application Priority Data

Jun. 30, 2005 (GB) .................................. 0513265.9

(51) Int. Cl.
H04N 5/76 (2006.01)
H04N 5/225 (2006.01)
(52) U.S. Cl. .................... 348/231.4; 348/220.1; 386/121
(58) Field of Classification Search ............... 348/231.7, 348/220.1, 222.1, 231.99
See application file for complete search history.

(56) References Cited

U.S. PATENT DOCUMENTS

| 4,792,866 A | 12/1988 | Hirobe et al. |
| 6,327,423 B1 | 12/2001 | Ejima et al. |
| 6,400,891 B1* | 6/2002 | Noda et al. ..................... 386/225 |
| 7,339,615 B2* | 3/2008 | Nishimura et al. ......... 348/220.1 |
| 2003/0142273 A1* | 7/2003 | Togashi et al. ................ 352/166 |
| 2003/0174218 A1* | 9/2003 | Battles et al. .............. 348/231.4 |
| 2004/0041917 A1 | 3/2004 | Norcross et al. |
| 2004/0051809 A1 | 3/2004 | Adams et al. |
| 2006/0047352 A1* | 3/2006 | Iida ................................ 700/94 |
| 2008/0116376 A1* | 5/2008 | Takane et al. ................. 250/307 |

FOREIGN PATENT DOCUMENTS

| EP | 0 862 317 | 3/2001 |
| GB | 2 250 625 | 6/1992 |
| GB | 2 386 493 | 9/2003 |
| JP | 2001-339681 | * 5/2000 |
| JP | 2001-339681 | 7/2001 |

OTHER PUBLICATIONS

Korean Office Action dated Feb. 20, 2009, 4 pages English translation and 4 pages Korean original.
Patent Abstracts of Japan, vol. 2002, No. 04, Aug. 4, 2002 & JP 2001 339681 A (Fuji Photo Film Co. Ltd), Dec. 7, 2001.

* cited by examiner

Primary Examiner — Hung Lam
(74) Attorney, Agent, or Firm — Alston & Bird LLP

(57) ABSTRACT

A portable electronic device comprising a image sensor for capturing image data and a audio sensor for capturing audio data. The portable device further comprising a processor coupled to said image sensor and said audio sensor, said processor having a first and second mode of operation, and a capture key coupled to said processor for initiating the first mode of operation, wherein said processor captures audio data and video data in the first mode of operation and is operable to capture audio data in the second mode of operation and the second mode of operation follows the first mode of operation.

23 Claims, 5 Drawing Sheets

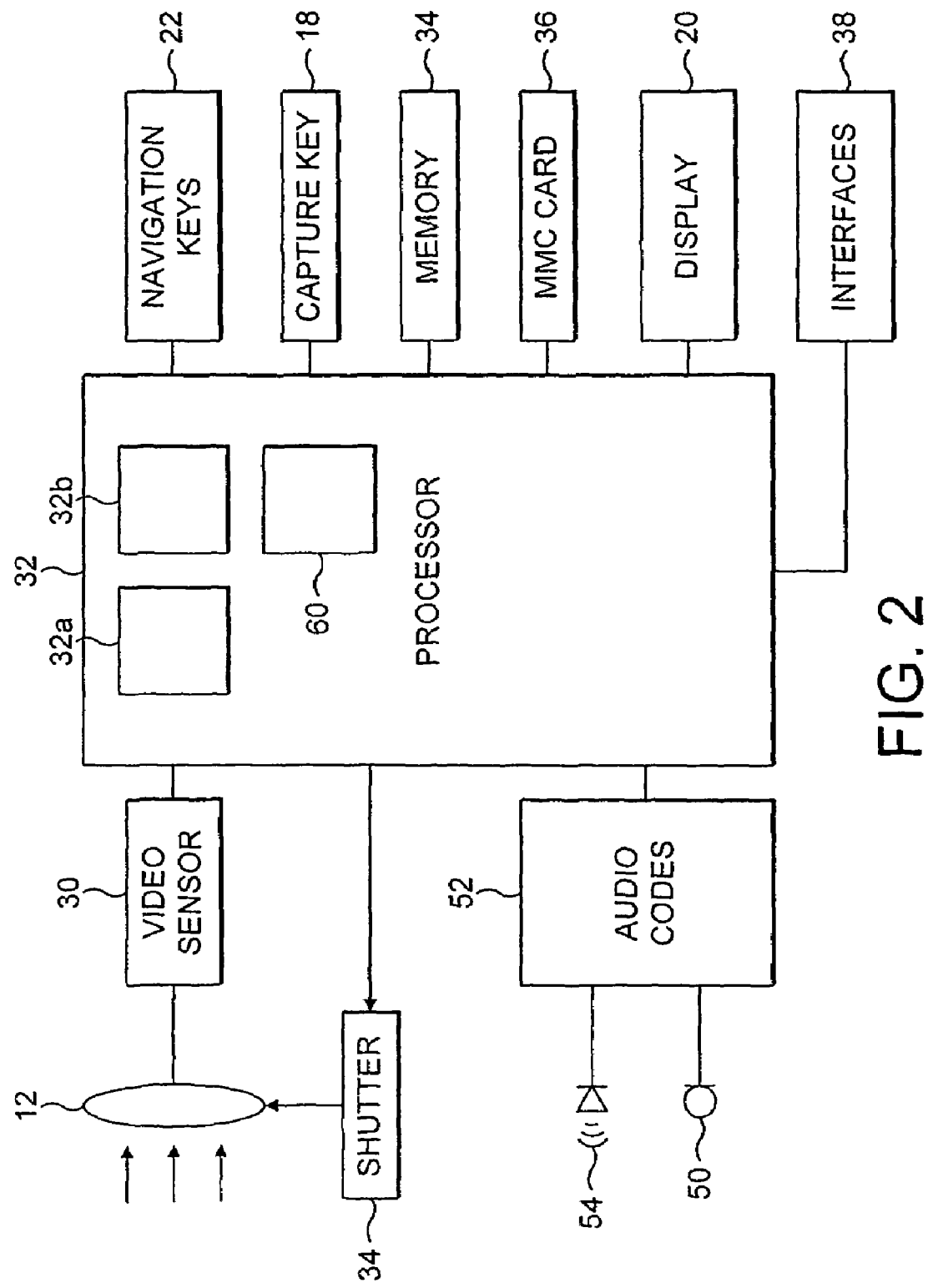

SINGLE-BUTTON AUDIO DATA CAPTURE AND DELETION

CROSS-REFERENCE TO RELATED APPLICATION

This application is the U.S. National Stage of International Application Number PCT/EP2005/055709 filed Nov. 2, 2005 and claiming priority from Great Britain Application Number GB 0513265 filed Jun. 30, 2005.

FIELD OF THE INVENTION

The present invention relates to audio data recording and deletion and in particular an arrangement for the recording and deletion of audio data in a device comprising a camera.

Preferred embodiments of the invention are particularly suited to devices including but not limited to radiotelephones comprising a camera, digital still cameras and camcorders. Embodiments of the invention could be applied to any device comprising audio and video capturing capability.

BACKGROUND OF THE INVENTION

Many camcorders and digital cameras allow the user to make a video recording and to capture sound signals to be associated with the video recording. More recently portable radiotelephones, such as the Nokia 6630 have incorporated cameras that also allow the user to make video recordings and record background audio data. Such devices permit the recording of audio data while the video recording is being made, typically by means of an actuable key.

Digital cameras, camera enabled phones and most camcorders also allow the user to take a single clip video commonly referred to as a still image. Still images are captured and may be printed, forwarded to another storage medium such as a home computer or shared with friends as part of a slideshow presentation; for example, a series of still images taken while on holiday. There is also a desire for the recording of audio signals to be associated with still image capture; for example, while on holiday a user may take a still image of a friend on a beach and may also want a recording of the sound of waves in the background. When later presenting a slideshow of the still images captured during the holiday, a short audio clip could accompany the still image clip.

However, the recording of an audio clip to be associated with a still image is not always required and preferably the user should be able to easily take still images while at the same time having the ability to decide whether to record an audio clip to be associated with a still image. GB2386493 provides a mechanical arrangement for providing a user with a solution to this problem. This application outlines a push button switch having a first, second and third position. In the first position the push button switch is at rest, upon depression by the user the push button switch moves to the second position where the push button activates the camera and takes a still image clip. Upon a further depression the push button switch moves to a third position where the recording of an audio clip commences. When the push button is no longer actuated the audio recording ceases.

While the solution outlined in GB2386493 provides a means of allowing the user to either take a still image clip only or to take a still image clip and then record a audio clip, there are a number of disadvantages to this arrangement. The push button switch must be able to occupy at least three positions so may be mechanically complicated when compared to a traditional push button switch having a first and second position only as is common on digital still cameras; which activates a camera shutter when moved to the second position. Additionally, as the capture of a still image commences when the push button switch is moved from the first to the second position; the audio capture is not initiated until the push button switch is moved from the second to the third position. The image and audio capture cannot commence at the same time.

It is an aim of embodiments of the present invention to solve or at least mitigate one or more of the disadvantages described above.

It is another aim of the present invention to provide an improved arrangement for the recording of audio data to be associated with image data for a device including audio and video capture functionality.

It is a further aim of the present invention to provide an improved arrangement for the automated deletion of audio data captured substantially at the same time as still image capture.

SUMMARY OF THE INVENTION

According to a one embodiment of the invention there is provided a portable electronic device comprising; a image sensor for capturing image data, an audio sensor for capturing audio data, a processor coupled to said image sensor and said audio sensor, said processor having a first mode of operation and a second mode of operation, and a capture key coupled to said processor for initiating the first mode of operation; wherein said processor captures audio data and video data in the first mode of operation and is operable to capture audio data in the second mode of operation and the second mode of operation follows the first mode of operation.

According to a second embodiment of the invention there is provided a processor for audio and video data capture; for reception of audio data and audio data processing and for reception of video data and video data processing, wherein upon reception of a control signal the processor initiates a first mode of operation for audio data processing and video data processing and audio data processing in a second mode of operation and the second mode of operation follows the first mode of operation.

According to a third embodiment of the invention there is provided a method of recording audio data and image data in a portable imaging device including a capture key, a processor, an audio sensor and a video sensor comprising: actuating the capture key, initiating capture of audio data from the audio sensor and video data from the video sensor, processing said audio data and said video data, creating an association between the captured audio data and said video data, removing any association between the captured audio data and said video data if the capture key is actuated for less than a pre-determined period, and deleting any audio data.

According to a further embodiment of the invention there is provided a method of recording audio data and image data in a portable imaging device including a capture key, a processor, an audio sensor and a video sensor comprising: actuating the capture key, initiating capture of audio data from the audio sensor and video data from the video sensor, processing said audio data and said video data and, deleting any audio data if the capture key is actuated for less than a pre-determined period.

According to another embodiment of the invention there is provided a method of recording audio data and image data in a portable imaging device including a capture key, a processor, an audio sensor and a video sensor comprising: actuating the capture key, initiating capture of audio data from the audio sensor and video data from the video sensor, processing said audio data and said video data, capturing audio data only if the capture key is actuated for more than a predetermined time period, and associating captured audio data with captured image data.

BRIEF DESCRIPTION OF THE DRAWINGS

Embodiments of the present invention will now be described with reference to the accompanying drawings briefly described below.

FIG. 2 shows an exemplary internal block structure of the camera device of FIGS. 1a and 1b;

DETAILED DESCRIPTION OF PREFERRED EMBODIMENTS OF THE PRESENT INVENTION

Figure 1A:
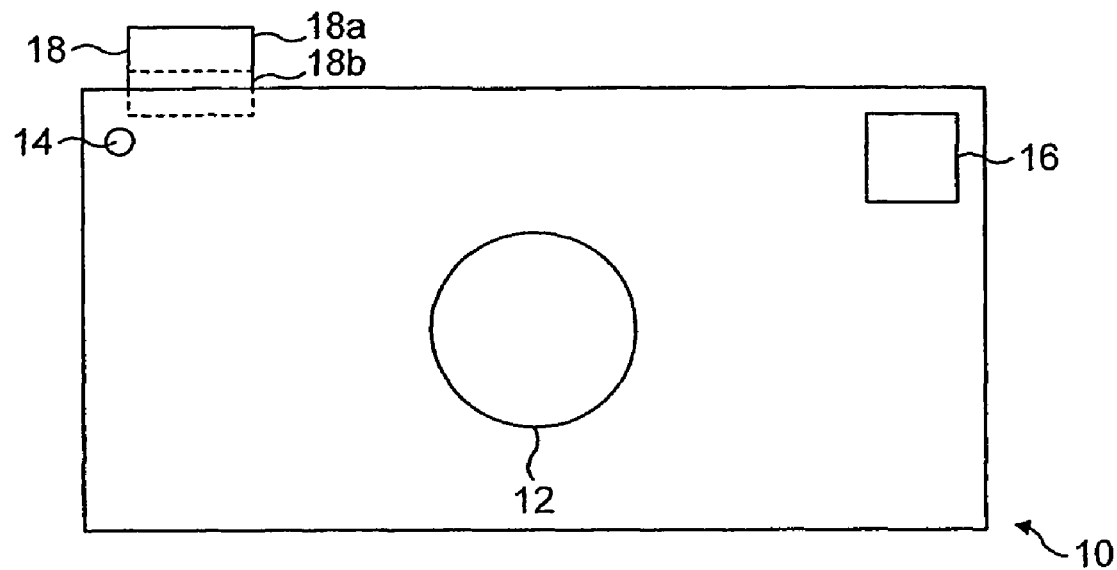
FIGS. 1a and 1b show a front and rear view of a camera device having audio and video functionality according to the present invention.
Figure 1B:
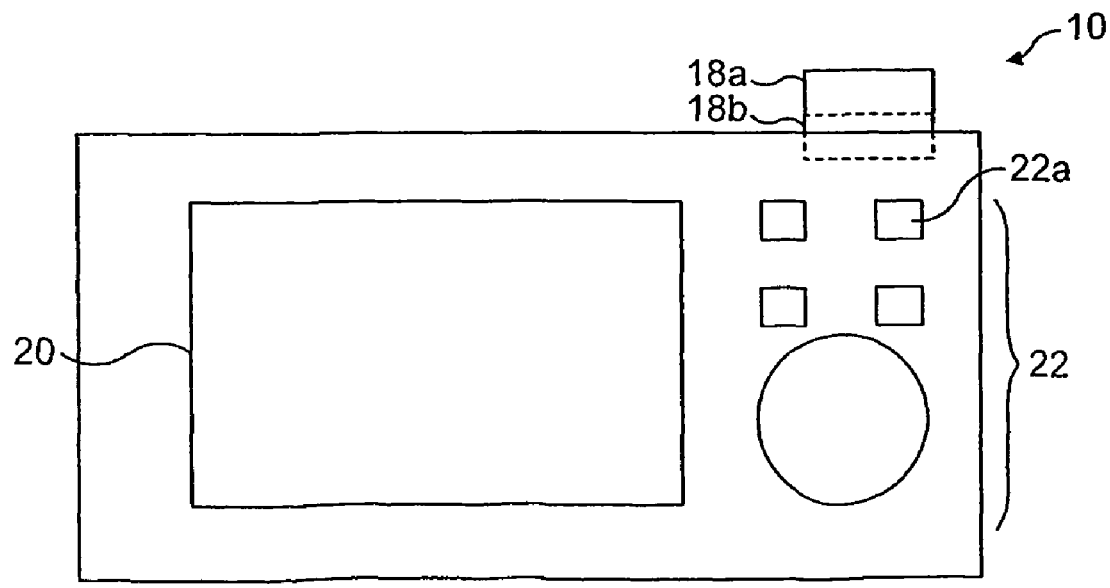

FIG. 1 illustrates a front view (FIG. 1a) and rear view (FIG. 1b) of a camera device 10 suitable for utilizing the present invention; the camera device 10 is illustrated in a landscape orientation. In alternative embodiments the camera device 10 may be any device capable of capturing audio and video data such as a camcorder, a radiotelephone including a camera or PDA device including a camera. FIG. 1a shows the front view of the camera device 10 which includes a lens 12 for focussing received light from a object to be captured, an audio sensor 14 for capturing audio data and a flash element 16 for illuminating an object to be captured. The lens 12, audio sensor 14 and the flash element 16 are all located on the front surface of the camera device 10.

Also illustrated is a capture key 18 having a first position 18a, illustrated by solid lines and a second position 18b, illustrated by dashed lines. Movement from the first position 18a to the second position 18b is achieved when the capture key 18 is actuated. The capture key 18 may be positioned ergonomically on an upper surface of the camera device 10. In a preferred embodiment the capture key 18 is a push button key that initiates the capturing of image data and audio data upon actuation. The capturing of image and audio data may be initiated when the capture key 18 is moved from the first position 18a to the second position 18b or when the capture key 18 is at the second position 18b.

In alternative embodiments the capture key 18 could be a slide key (not shown) or part of a touchpad input device (not shown). In the case of a touchpad the capture key need not be physically moved by the user but may be actuated by non contact sensing means, for example capacitive or inductive means caused by the user placing a finger over the area defining a capture key. The capture key 18 may also be placed on an alternative surface such as the rear or front surface.

FIG. 1b illustrates the rear view of the camera device 10 including a display 20 for previewing the object to be captured and for reviewing previously captured images; the display 20 has a landscape orientation. A set of navigation keys 22 for accessing menu structures and for inputting data are positioned to the right of the display 20, there may also be navigational keys below the display 20 (not shown). Also illustrated is the capture key 18 of FIG. 1a.

In other devices such as a radiotelephone comprising a camera where there may be more than one preferred operational axis, there may be more than one capture key. A radiotelephone in a first operational axis that corresponds to a portrait orientation, may have a first capture key positioned close to the user input keys so that images may be taken in a portrait format. A second capture key may be ergonomically positioned along a side surface for actuation of the camera when the radiotelephone is placed in a second operational axis; a landscape orientation. One or both capture keys may also capture audio data and image data according to the present invention.

FIG. 2 provides a schematic block diagram of the general internal structure of the camera device 10. The lens 12 is coupled to a video sensor 30 which may be any suitable sensor for receiving light such as a charged coupled device (CCD) sensor or complimentary metal oxide semiconductor (CMOS) sensor. The video sensor 30 is coupled to a processor 32 where received data from the sensor 30 is processed into an image. The processor 32 may also include additional processors, such as an audio processor 32a and an image processor 32b, dedicated to the processing of the received data from the sensor 30. In an alternative arrangement the audio 32a and video processors 32b may be discrete devices coupled to the processor 32.

The lens 12 is also coupled to a shutter 34 that is actuated by the capture key 18. The shutter 34 may be mechanical or may comprise a liquid crystal shutter arrangement and is used to allow light to pass through the lens 12 to the sensor 30 upon actuation of the capture key 18. The shutter 34 is also coupled to the processor 32.

A microphone 50 for the capturing of audio data is coupled to an audio codec 52 that is coupled to the processor 32. Also connected to the audio codec 52 is a speaker 54 which may be used for the playback of recorded audio data. The capturing of audio data is initiated by the capture key 18.

Also illustrated are the navigational keys 22, the capture key 18, the display 20 and internal memory 34 coupled to the processor 32. Additionally, the portable device may comprise interfaces for communicating with other devices such as a universal Serial bus (USB) interface 38. It is also a common feature of most electronic camera devices to have an interface to a removable memory card 36 such as a MMC card for the saving of files such as image files or audio files.

Figure 3:
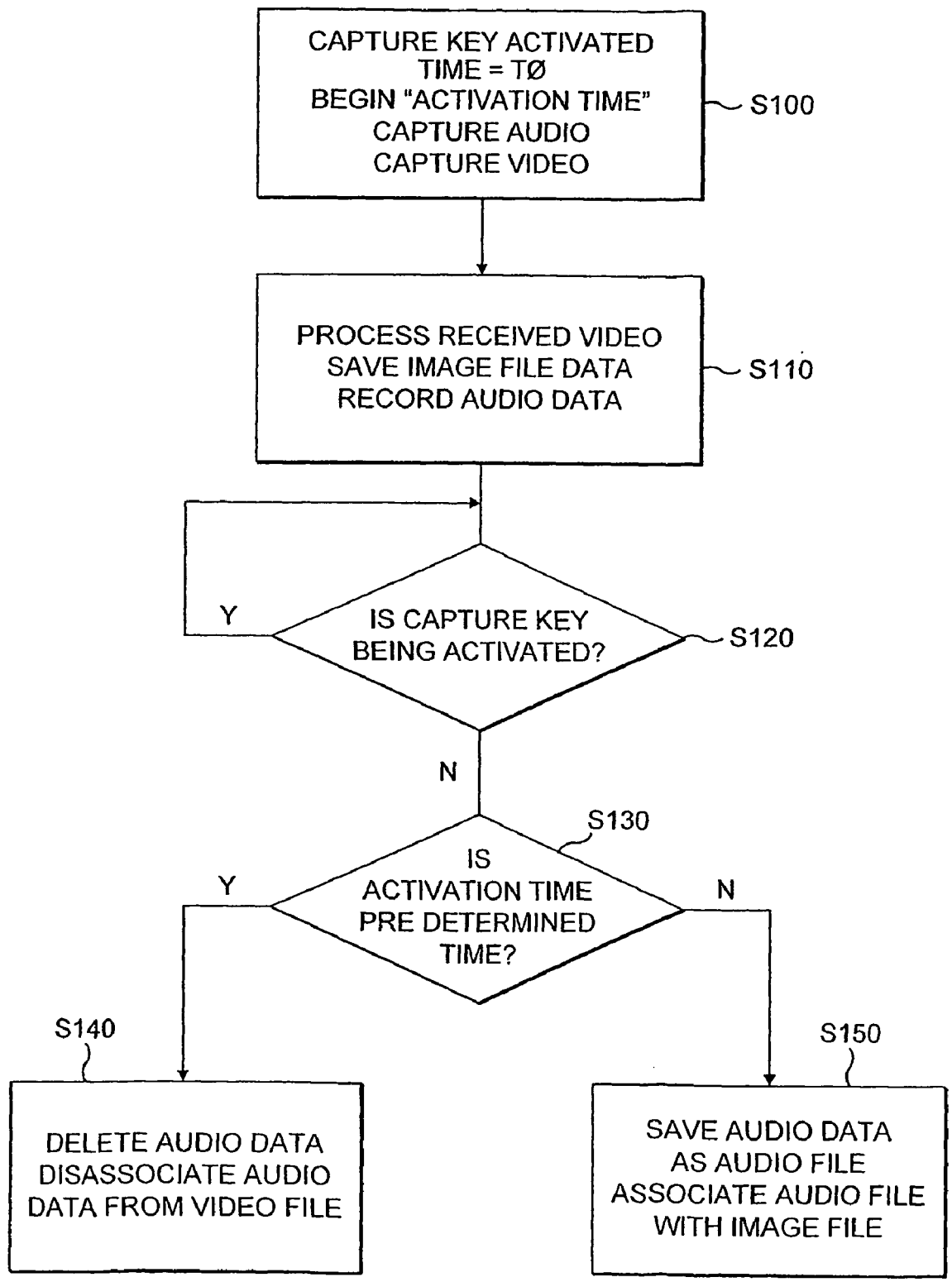
FIG. 3 shows a flow chart illustrating an embodiment of the invention.

FIG. 3 illustrates steps of an exemplifying first embodiment of the invention with reference to FIGS. 1 and 2.

Step 100 of FIG. 3, outlines that the capture key 18 is actuated from a first to a second position. Upon actuation, the capture key 18 will send a control signal to the processor 32 which will initiate a first mode of operation, during which video data will be captured by the lens 12 and video sensor 30 and the audio data will be captured by the microphone 50 and audio codec 52. Preferably the capture of audio data and video data will occur at substantially the same time. The control signal sent to the processor will also begin a counter to signify the start time of the capture key 18 actuation. The time duration over which the capture key 18 is actuated will be referred to as the 'actuation time'.

Step 110 outlines that the processor 32 will receive data from the video sensor 30 and upon receipt of the data an image may be constructed and saved to internal memory 34 as an image file. The audio codec 52 will receive data from the microphone 50 and arrange this data into a suitable file format, such as WAV (Waveform Audio Format) or MP3

(MPEG-1 Audio Layer 3). In a preferred embodiment the audio codec 52 will continue to process received audio data while the capture key 18 is actuated.

In step 120 the processor 32 will check whether the capture key 18 is still being actuated. The processor 32 will monitor the actuation of the capture key 18 and update the 'actuation time'.

When the capture key 18 is no longer actuated, the processor 32 records the actuation time as being the time from actuation of the capture key 18 to the time that actuation of the capture key 18 ends, in a preferred embodiment when the capture key 18 is no longer actuated the recording of audio data stops. In step 130 the actuation time is compared to a predetermined time. The predetermined time is a value held within the processor 32, the function of the predetermined time is to flag an operational change of mode within the processor 32. If the actuation time is less than the predetermined time then the processor 32 operates in a first operational mode outlined by step 140 and if the actuation time is greater than the predetermined time then the processor 32 operates in a second operational mode outlined by step 150. The second mode of operation can only follow the first mode of operation.

The predetermined time may be a value selected by the end user and held within memory 34.

In step 140 the actuation time is less than the predetermined time and the processor 32 will operate in the first operational mode. Any audio data that has been recorded either as raw data (i.e. unprocessed data) or processed data held in an audio file either in temporary or permanent memory will be deleted. Any association which may have been made between the image file of step 110 and the audio data and or file will be removed. The first operational mode of the processor 32 corresponds to an end user wishing to capture still images but not wishing to record any audio data to be associated with the still image capture.

In step 150 the actuation time has been determined as being greater than the predetermined time and the processor 32 will operate in a second operational mode. Any unprocessed audio data will be processed and saved as an audio file within either internal memory 34 or removable memory 36 and an association will be made with the image file of step 110 if it has not already done so within the first mode of operation. Any subsequent reviewing of the image file on the display 20 may be accompanied by the playing of the associated audio file through the speaker 54.

If any association is to be made between the captured audio and image data in the second mode of operation then this may be done when the processor first switches between the first and second mode of operation. Alternatively a flag may be set within the processor when the switch occurs; association may then be made after the audio data has been captured i.e. when the capture key 18 is no longer actuated.

Additionally, when the image file is transferred, for example to an external device such as a personal computer the user may be asked if they want to also transfer any associated files also, such as the saved audio file. In an alternative embodiment the audio file may be transferred and the user may be asked if they wish to transfer the associated image file. The second operational mode of the processor 32 corresponds to an end user wishing to capture still images and also wishing to record audio data to be associated with the still image capture.

Figure 4A:
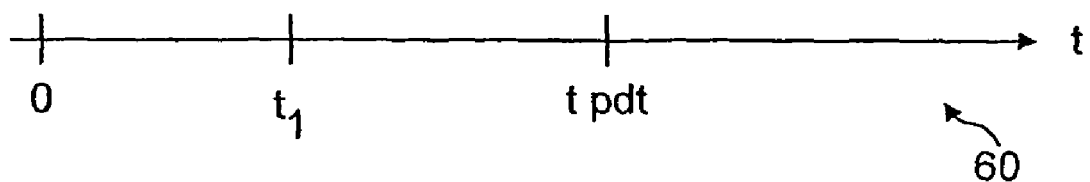
FIGS. 4a and 4B illustrate an exemplary timeline of the operative steps of the present invention corresponding to the processor operating in a first operative mode (FIG. 4a) and in a second operative mode (FIG. 4B)
Figure 4B:
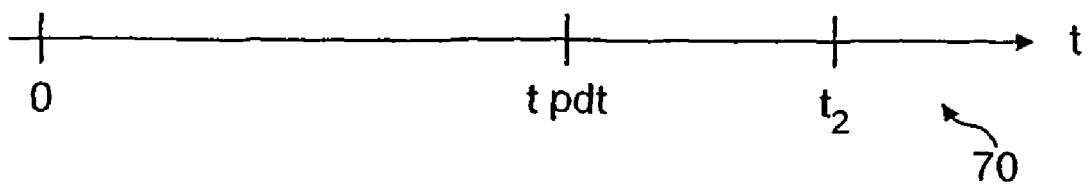

FIGS. 4a and 4B show exemplary timelines (60,70) illustrating the first mode of operation of the processor (FIG. 4a) and the second mode of operation (FIG. 4B) with reference to FIGS. 1-3 in order to clarify the present invention.

FIG. 4a shows a timeline 60 which at time t=0 corresponds to the actuation of the capture key 18 of FIG. 1. As illustrated in FIG. 1 the actuation corresponds to the push button capture key 18 being moved from the first position 18a to the second position 18b. The actuation of the capture key 18 as outlined in step 100 of FIG. 3 initiates the first mode of operation that includes capturing of audio data and video data by the audio codec 52 and video sensor 30 respectively. Also shown on the timeline 60 after time t=0 is a marker tpdt (pre-determined time) indicating an elapsed time which corresponds to a change in the operational mode of the processor 32.

On the timeline 60 is another marker at time t=t1; the time between t=0 and t=t1 corresponds to the time duration over which the capture key 18 has been actuated, the actuation time. In an embodiment of the present invention if time t=0 corresponds to the actuation of the capture key 18 then time t=t1 corresponds to the capture key 18 no longer being actuated. The time t=t1 is less than the time t=tpdt and in accordance with step s140 of FIG. 3 the processor 32 remains in a first operational mode corresponding to an end user not wishing to associate audio data with a captured image. Any recorded audio data will be deleted and any association made between the audio data and the image data will be deleted.

FIG. 4B shows a timeline 70 corresponding to a second mode of operation of the processor 32. FIG. 4B has markers for time t=0 and t=tpdt corresponding to those in FIG. 4a. The timeline 70 has a marker at time t=t2. This marker has the same function as time t=t1 of FIG. 4a in that it signifies when the capture key 18 is no longer actuated, i.e. the actuation time. Unlike FIG. 4a the time t=t2 occurs after the time t=tpdt and in accordance with step s150 of FIG. 3 the processor 32 has entered a second mode of operation corresponding to an end user wishing to associate audio data with a captured image. Any recorded audio data will be associated with captured image data.

In the second mode of operation the time duration between time t=0 and time t=t2, the actuation time, also corresponds to the time over which audio data is collected and recorded. For example if the actuation time is 10 seconds then 10 seconds of audio data will be captured. Recording audio data while the capture key 18 is actuated is a preferred embodiment as it allows the user to record audio clips of varying duration. In an alternative embodiment, the recording of audio data may be of fixed duration; when the actuation time exceeds the predetermined time, the processor 32 knowing it is in a second operational mode will continue to record audio data for a fixed duration independent of the actuation of the capture key 18. The fixed duration over which audio data may be recorded in the second operational mode may be a variable held within memory 34 which the user can change, for example 15 seconds. If the predetermined time is 2 seconds and the user actuates the capture key 18 for more than 2 seconds then audio data would be captured for 15 seconds.

Figure 5A:
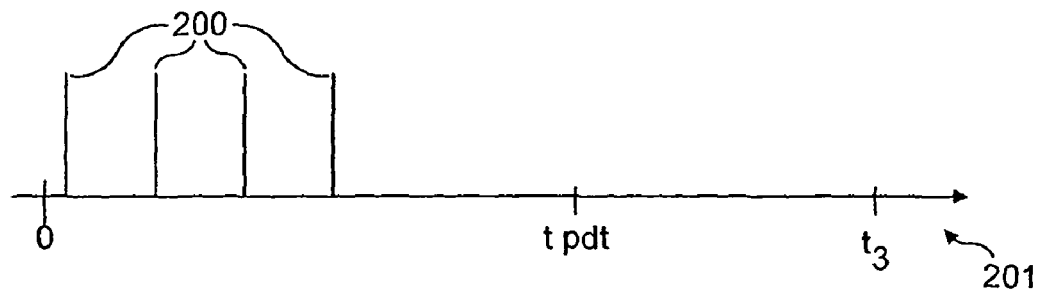
FIGS. 5a and 5b illustrate an exemplary timeline applicable to a burst mode of operation.

The present invention is also suited to devices that capture a plurality of still images in quick succession, commonly referred to as burst mode or continuous shooting mode. The user may activate the burst mode feature by means of a menu option, upon actuation of the capture key the imaging device will take a succession of still images. FIG. 5a shows a timeline 201 from time t=0 (corresponding to when the capture key is actuated) to a time t3 which exceeds the predetermined time (tpdt). Four still images 200 are captured in the first mode of operation, the number of still images to be captured is dependent upon the processing power and memory capability of the imaging device. The capturing of the still images occurs within a first mode of operation so that audio may still be captured when the images are captured. As the capture key 18 remains actuated for more than the predetermined time period (tpdt) the audio is retained. The audio may then be played back upon viewing the succession of still images. As outlined earlier if the user wishes to capture a plurality of still images in burst mode but does not wish to save any audio that has been recorded in accordance with the first mode of operation then the user releases the capture key 18 before the capture key 18 has been actuated for more than the predetermined period.

Alternatively, a user may not wish to activate a burst mode by accessing a menu option, in which case a second key 22a of FIG. 1b, may be actuated at substantially the same time as the capture key 18 to indicate that a succession of still images should be captured during the first mode of operation. Should a user wish to capture still images only without retaining the audio then de-actuating the capture key 18 before the predetermined time will remove any association already made between the captured video data and the audio data and the captured audio data will be deleted.

Figure 5B:
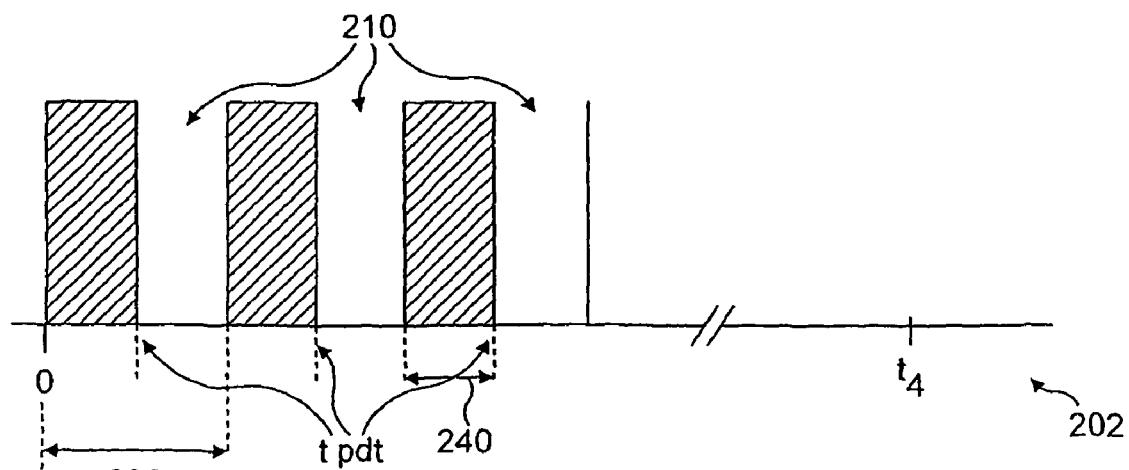

In an alternative arrangement, a burst mode could be enabled as described by the first embodiment. FIG. 5b illustrates a timeline 202 where the predetermined time 240 is set at 2 seconds and the user has set the fixed duration 230 of audio capture during the second mode of operation to be 4 seconds. By keeping the capture key 18 actuated for a time period corresponding to t4, for example 50 seconds, the imaging device will cycle through the first modes of operation 240 (shaded areas) and second modes of operation 210 (unmarked areas) while the capture key 18 is actuated; capturing a still image every 4 seconds and capturing 4 seconds of audio data to be associated with each still image. By reducing the predetermined time 240 and/or the fixed duration 230 the user may capture less audio data per captured still image.

The present invention is further suited to devices which permit video recording. During the first mode of operation image data may be captured continuously along with audio data and in the second mode of operation as outlined earlier, audio data only may be captured. This may be advantageous when the memory of the device is limited and only short bursts of video data are required to be captured over a longer time period than would be available if video data were captured continuously; audio data may be captured continuously as it does not require as much memory capacity as video data.

Security devices which have to operate over a long time period, for example hours or days may wish to capture intermittent video and continuous audio, in such a device the first mode of operation may be initiated by means of video sensors arranged to detect motion. Upon sensing motion audio and video data may be captured in the first mode of operation; the device may continue to capture audio and video in the first mode of operation until the sensor no longer detects motion. When motion is no longer detected video capture stops and audio data is captured for a fixed time duration.

In a second embodiment of the present invention the processor 32 of FIG. 2 is arranged for audio and video data capture. The processor may comprise further processors, for example an audio processor 32a for audio data processing and a video processor 32b for video data processing on a single integrated circuit; alternatively the processor may be coupled to discrete audio and video processors.

The processor 32 is arranged to receive a control signal via an interface 60, coupled to the capture key 18 of FIGS. 1 and 2; upon actuation of the capture key 18 a change in the logic state on one of the terminals of interface 60 may signify that the capture key 18 has been actuated. Upon a change in the logic state or upon receiving data indicating that the capture key 18 has been actuated the processor 32 initiates a first mode of operation. In the first mode of operation the video processor 32b, video sensor 30 and shutter 34 are instructed to capture and process video data; substantially simultaneously the audio codec 52 and audio processor 32a are instructed to capture and process audio data. The processor 32 may retain the audio and video data in a short term buffer or send the captured data to memory. As outlined earlier the audio data may be retained dependent upon the actuation of the capture key 18.

Although embodiments of the present invention have been described in the preceding paragraphs with reference to various examples, it should be appreciated that modifications to the examples given can be made without departing from the scope of the invention as claimed.

While endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A device comprising:
an image sensor configured to capture image data;
an audio sensor configured to capture audio data;
a processor configured to have a first mode of operation and a second mode of operation; and
a capture key configured to initiate the first mode of operation;
wherein said processor is configured to capture audio data and video data in the first mode of operation and is operable to capture audio data in the second mode of operation and the second mode of operation follows the first mode of operation;
wherein said processor associates captured audio data with captured image data in the first mode of operation; and
wherein said association between the captured audio data and the captured image data is removed if the actuation of the capture key is less than a predetermined time period.

2. A device according to claim 1, wherein a switch between the first mode of operation and the second mode of operation is made in dependence on actuation of the capture key.

3. A device according to claim 2, wherein the switch between the first mode of operation and the second mode of operation is made when the actuation of the capture key exceeds a pre-determined time period.

4. A device according to claim 3, wherein the predetermined time period is a variable determined by a user.

5. A device according to claim 1, wherein a switch from the first mode of operation to the second mode of operation occurs when the capture key is in a same position.

6. A device according to claim 1, wherein said processor associates captured audio data with captured image data in the second mode of operation.

7. A device according to claim 1, wherein said processor sets a flag when said device switches from the first mode of operation to the second mode of operation and associates said audio data with said image data after the audio data in the second mode of operation has been captured.

8. A device according to claim 1, wherein said audio data is deleted if the actuation of the capture key is less than the predetermined time period.

9. A device according to claim 1, wherein said audio data is captured while the capture key is actuated.

10. A device according to claim 1, wherein said audio data is captured for a fixed time duration when the electronic device switches from the first mode of operation to the second mode of operation.

11. A device according to claim 10, wherein said fixed time duration may be a variable set by the user.

12. A device according to claim 1, wherein the image data is a still image.

13. A device according to claim 12, further comprising a second key coupled to the processor, wherein when the capture key and the second key are actuated at substantially the same time a plurality of still images may be captured in the first mode of operation.

14. A device according to claim 12, further comprising a user definable menu option, wherein the menu option permits capturing of a plurality of still images upon actuation of the capture key in the first mode of operation.

15. A device according to claim 1, further comprising a plurality of capture keys coupled to the processor each of which may initiate the first mode of operation.

16. A device according to claim 1, wherein the device may be any one of: a portable electronic device, a radiotelephone, a digital camera, a personal digital assistant or a camcorder.

17. A processor configured
for reception of audio data and audio data processing and
for reception of video data and video data processing,
wherein upon reception of a control signal the processor initiates a first mode of operation for audio data processing and video data processing and audio data processing in a second mode of operation and the second mode of operation follows the first mode of operation;
wherein said processor is further configured:
for associating received audio data with received video data in the first mode of operation, and
for removing said association if said control signal is received for less than a predetermined time period.

18. A processor according to claim 17, wherein a switch between the first mode of operation and the second mode of operation occurs when the control signal has been received for a pre-determined time period.

19. A processor according to claim 17 for a portable imaging device.

20. A method comprising:
actuating a capture key,
initiating capture of audio data from an audio sensor and video data from a video sensor,
processing captured audio data and captured video data,
creating an association between the captured audio data and said captured video data,
removing any association between the captured audio data and said captured video data if the capture key is actuated for less than a pre-determined period, and
deleting the captured audio data if the capture key is actuated for less than the pre-determined period.

21. A method comprising:
actuating a capture key,
initiating capture of audio data from an audio sensor and capture of video data from a video sensor,
processing said audio data and said video data, and
deleting the audio data if the capture key is actuated for less than a predetermined period.

22. A method comprising:
receiving a control signal;
responsive to the receipt of the control signal, initiating a first mode of operation for processing received audio data and processing received video data and processing received audio data in a second mode of operation which follows the first mode of operation;
associating the received audio data with the received video data in the first mode of operation; and
removing the association if said control signal is received for less than a predetermined time period.

23. Apparatus, comprising:
a processor; and
memory, the memory configured to, with the processor, cause the apparatus at least to perform:
receive a control signal;
initiate, in response to receipt of said control signal, a first mode of operation for processing received audio data followed by a second mode of operation for processing received video data and processing received audio data;
associate the received audio data with the received video data in the first mode of operation; and
remove the association if said control signal is received for less than a predetermined time period.

* * * * *